(12) United States Patent
Yu et al.

(10) Patent No.: US 12,149,040 B2
(45) Date of Patent: Nov. 19, 2024

(54) MULTI-WAVELENGTH MID-INFRARED LASER PULSE TRAIN CAVITY DUMPED LASER BASED ON ND:MGO:APLN CRYSTAL

(71) Applicant: CHANGCHUN UNIVERSITY OF SCIENCE AND TECHNOLOGY, Jilin (CN)

(72) Inventors: Yongji Yu, Jilin (CN); Hang Liu, Jilin (CN); Guangyong Jin, Jilin (CN); Yuheng Wang, Jilin (CN); Chao Wang, Jilin (CN); Yuan Dong, Jilin (CN)

( * ) Notice: Subject to any disclaimer, the term of this patent is extended or adjusted under 35 U.S.C. 154(b) by 0 days.

(21) Appl. No.: 18/701,213

(22) PCT Filed: Jul. 6, 2021

(86) PCT No.: PCT/CN2021/104812
§ 371 (c)(1),
(2) Date: Apr. 12, 2024

(87) PCT Pub. No.: WO2022/246967
PCT Pub. Date: Dec. 1, 2022

(65) Prior Publication Data
US 2024/0339798 A1 Oct. 10, 2024

(30) Foreign Application Priority Data
May 27, 2021 (CN) .......................... 202110585689.9

(51) Int. Cl.
*H01S 3/108* (2006.01)
*H01S 3/081* (2006.01)
(Continued)

(52) U.S. Cl.
CPC ............ *H01S 3/0813* (2013.01); *H01S 3/082* (2013.01); *H01S 3/1083* (2013.01);
(Continued)

(58) Field of Classification Search
CPC ......... H01S 3/1083; H01S 3/1123–127; H01S 3/081–082; G02F 1/35–3534; G02F 1/39–397
See application file for complete search history.

(56) References Cited

U.S. PATENT DOCUMENTS 7,079,557 B1 * 7/2006 Yin ........................ H01S 3/1083
372/21
7,869,471 B1 * 1/2011 Yin .......................... H01S 3/115
372/100

FOREIGN PATENT DOCUMENTS

CN 107528197 A 12/2017
CN 109149346 A 8/2019
(Continued)

*Primary Examiner* — Tod T Van Roy
*Assistant Examiner* — Delma R Forde
(74) *Attorney, Agent, or Firm* — Addison D. Ault; Richard P. Moerschell; IPGentleman Intellectual Property Services, LLC (57) ABSTRACT

A multi-wavelength mid-infrared laser pulse train cavity dumped laser based on Nd:MgO:APLN crystal is disclosed. In response to the needs in the field of differential absorption lidar, it is necessary to introduce multi-fundamental frequency light pulse accumulation and superposition, and parametric light synchronization pulse compression technology in the multi-wavelength mid-infrared laser operating mechanism. To this end, a splayed parametric light oscillation cavity formed in conjunction with a Nd:MgO:APLN crystal is disclosed, wherein it is possible to obtain multi-wavelength mid-infrared laser pulse train output with narrow pulse width and high peak power, meeting the needs of differential absorption lidar for mid-infrared lasers.

20 Claims, 5 Drawing Sheets

(51) Int. Cl.
*H01S 3/082* (2006.01)
*H01S 3/11* (2023.01)
*H01S 3/1123* (2023.01)
*H01S 3/16* (2006.01)

(52) U.S. Cl.
CPC .......... *H01S 3/1103* (2013.01); *H01S 3/1123* (2023.01); *H01S 3/1611* (2013.01); *H01S 3/1671* (2013.01); *H01S 3/1691* (2013.01); *H01S 2302/00* (2013.01)

(56) References Cited

FOREIGN PATENT DOCUMENTS

| | | | | |
|---|---|---|---|---|
| CN | 113078541 | * | 7/2021 | ......... H01S 3/10061 |
| CN | 113314939 | * | 8/2021 | ............. H01S 3/082 |
| CN | 114243434 | * | 3/2022 | ............... H01S 3/07 |

* cited by examiner

MULTI-WAVELENGTH MID-INFRARED LASER PULSE TRAIN CAVITY DUMPED LASER BASED ON ND:MGO:APLN CRYSTAL

CROSS-REFERENCE TO RELATED APPLICATION

This application is a Section 371 National Stage Application of International Application No. PCT/CN2021/104812, filed on Jun. 7, 2021, entitled "MULTI-WAVELENGTH MID-INFRARED LASER PULSE TRAIN CAVITY DUMPED LASER BASED ON ND:MGO:APLN CRYSTAL", which claims priority to Chinese Application No. CN202110585689.9, filed on May 27, 2021, incorporated herein by reference in their entirety.

TECHNICAL FIELD

The present disclosure relates to the field of solid lasers, and in particular to a multi-wavelength mid-infrared laser pulse train cavity dumped laser based on ND:MGO:APLN crystal.

BACKGROUND

Multi-wavelength mid-infrared laser is widely applied in cutting-edge scientific and technological fields such as military multi-band laser jamming and countermeasure, optical difference frequency, dual-comb spectroscopy, and high-precision synchronous detection of environmental multi-component gases. Currently, the most common way to obtain multi-wavelength mid-infrared laser is to use aperiodically poled MgO:APLN crystals, set multiple reciprocal lattice vectors in a single crystal, and simultaneously compensate for multiple sets of phase mismatches to achieve synergistic oscillation of multiple sets of parametric light. Furthermore, laser gain ion $Nd^{3+}$ is doped with MgO:APLN to realize the functional integration of both fundamental frequency generation and parametric frequency conversion, solving the problem that the traditional structure for fundamental frequency light generation and multi-light parametric oscillation is difficult to be miniaturized and integrated.

Figure 1:
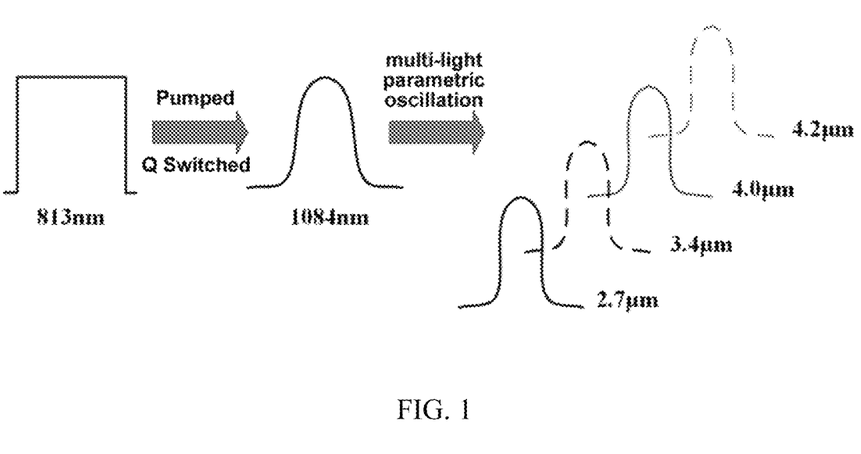
FIG. 1 is a schematic time domain diagram of multi-light parametric oscillation in the prior art.

Different application fields put forward different special requirements for the time domain, frequency domain, and spatial domain characteristics of the output multi-wavelength mid-infrared laser. Taking differential absorption lidar as an example, the echo formed by the compression of the time-domain pulse train of the emitted laser has the effect of feedback coupling enhancement, which can effectively improve the multi-component monitoring feedback signal-to-noise ratio. Therefore, differential absorption lidar requires multi-wavelength mid-infrared laser pulse trains as a light source. Under the Q-switched operating mechanism, the continuous laser pump light passes through the laser crystal to generate fundamental frequency light in the form of pulses. A single fundamental frequency light pulse can only form a single parametric light pulse in the frequency-conversion crystal (as shown in FIG. 1). The multi-wavelength mid-infrared laser pulses generated by this operation mode have a constant frequency and a small duty cycle, and cannot generate high repetition frequency laser pulse trains. In response to the needs in the field of differential absorption lidar, it is necessary to introduce multi-fundamental frequency light pulse accumulation and superposition, and parametric light synchronization pulse compression technology in the multi-wavelength mid-infrared laser operating mechanism. If the multi-wavelength mid-infrared laser source uses the above two technologies, it can obtain multi-wavelength mid-infrared laser pulse train output with narrow pulse width and high peak power, meeting the needs of differential absorption lidar for mid-infrared lasers.

SUMMARY

In order to obtain multi-wavelength mid-infrared laser pulse train output with narrow pulse width and high peak power, the present disclosure provides a multi-wavelength mid-infrared laser pulse train cavity dumped laser based on ND:MGO:APLN crystal.

The technical solutions adopted by the present disclosure to solve the technical problems are as follows: A multi-wavelength mid-infrared laser pulse train cavity dumped laser based on ND:MGO:APLN crystal, comprising a first pump module, a first coupling lens group, a second pump module, a second coupling lens group, a first cavity mirror, a second cavity mirror, Nd:MgO:APLN crystal, a plane lens, a third cavity mirror, a output mirror, a first lens, MgO:PPLN crystal, a fourth cavity mirror, a second lens, a fifth cavity mirror, a Q switch, a sixth cavity mirror, wherein:

the first cavity mirror, the second cavity mirror, the third cavity mirror and the fourth cavity mirror form a splayed parametric light oscillation cavity;

the Nd:MgO:APLN crystal is placed between the first cavity mirror and the second cavity mirror;

the plane lens is placed between the second cavity mirror and the third cavity mirror;

the first lens and the MgO:PPLN crystal are sequentially placed between the third cavity mirror and the fourth cavity mirror;

the second lens and the fifth cavity mirror are sequentially arranged on an extension line formed by the first cavity mirror and the fourth cavity mirror;

the Q switch and the sixth cavity mirror are sequentially arranged on the same side of the fifth cavity mirror;

the first cavity mirror, the second cavity mirror, the fourth cavity mirror, the fifth cavity mirror, the sixth cavity mirror and the plane lens form a fundamental frequency light resonant cavity;

the first coupling lens group and the first pump module are sequentially arranged outside the first cavity mirror, and the second coupling lens group and the second pump module are sequentially arranged outside the second cavity mirror;

the output mirror is arranged aside below the first lens to emit the generated multi-wavelength mid-infrared laser out of the resonant cavity.

According to some embodiments of the present disclosure, the MgO:PPLN crystal is one-dimensional polarized crystal, with alloy evaporated on upper and lower end surfaces of the crystal and connected to a DC voltage source.

According to some embodiments of the present disclosure, the Q switch is an acousto-optical Q switch or an electro-optical Q switch.

According to some embodiments of the present disclosure, the third cavity mirror, the fourth cavity mirror and the fifth cavity mirror are plane mirrors.

According to some embodiments of the present disclosure, the first cavity mirror, the second cavity mirror and the sixth cavity mirror are plano-concave mirrors.

According to some embodiments of the present disclosure, the output mirror is coated with a total reflection film of 2.7 μm-4.5 μm.

According to some embodiments of the present disclosure, the first cavity mirror, the second cavity mirror, the third cavity mirror and the fourth cavity mirror are coated with a total reflection film of 2.7 µm-4.5 µm.

According to some embodiments of the present disclosure, the plane lens is coated with a total reflection film of 1084 nm and a total transmission film of 2.7 µm-4.5 µm.

The beneficial effects of the present disclosure are as follows: the multi-wavelength mid-infrared laser pulse train cavity dumped laser based on Nd:MgO:APLN crystal adopts a composite resonant cavity structure. The Q switch is placed in a fundamental frequency light resonant cavity, and the pump light is injected into the Nd:MgO:APLN crystal from both ends to generate fundamental frequency light with a pulse mechanism. The fundamental frequency light oscillates in a parametric light oscillation cavity composed of the first cavity mirror to the fourth cavity mirror, and generates multi-light parametric oscillation through the Nd:MgO:APLN crystal, to generate multi-wavelength mid-infrared laser. When the laser is running, the Q switch performs turning-on or turning-off actions multiple times, and several fundamental frequency light pulses accumulate in the fundamental frequency light resonant cavity. The fundamental frequency light pulses are injected into the parametric light oscillation cavity to generate multiple multi-wavelength mid-infrared laser pulses. Then, after a transverse electric field is applied to the MgO:PPLN crystal, the propagation direction of the mid-infrared laser pulse is deflected due to diffraction effect, and all the mid-infrared laser pulses in the parametric light oscillation cavity are dumped out, that is, cavity dumping is achieved. The emitted parametric light is reflected by the output mirror, and finally a multi-wavelength mid-infrared laser pulse train output with narrow pulse width and high peak power is obtained.

It should be understood that the foregoing general description and the following detailed description are exemplary and explanatory only, and do not limit the present disclosure.

BRIEF DESCRIPTION OF THE DRAWINGS

Other features, objects and advantages of the present disclosure will become more apparent through the following detailed description of nonrestrictive embodiments in conjunction with the accompanying drawings. In the drawings.

In the drawings: 101—first pump module, 201—first coupling lens group, 102—second pump module, 202—second coupling lens group, 3—first cavity mirror, 4—second cavity mirror, 5—Nd:MgO:APLN crystal, 6—plane lens, 7—third cavity mirror, 8—output mirror, 9—first lens, 10—MgO:PPLN crystal, 11—fourth cavity mirror, 12—second lens, 13—fifth cavity mirror, 14—Q switch, 15—sixth cavity mirror.

DETAILED DESCRIPTION OF EMBODIMENTS

Hereinafter, exemplary embodiments of the present disclosure will be described in detail with reference to the accompanying drawings in order that those skilled in the art can easily implement them. Also, for clarity, those parts that are not related to describing the exemplary embodiments are omitted in the drawings.

In the present disclosure, it should be understood that terms such as "comprising", "including" or "having" are intended to indicate the presence of features, numbers, steps, actions, components, parts or combinations thereof disclosed in the specification, but are not intended to exclude one or a plurality of other features, numbers, steps, actions, components, parts or combinations thereof.

In addition, it should be noted that, in the case of no conflict, the embodiments and the features in the embodiments in the present disclosure can be combined with each other. The present disclosure will be described in detail below with reference to the accompanying drawings and embodiments.

Figure 2:
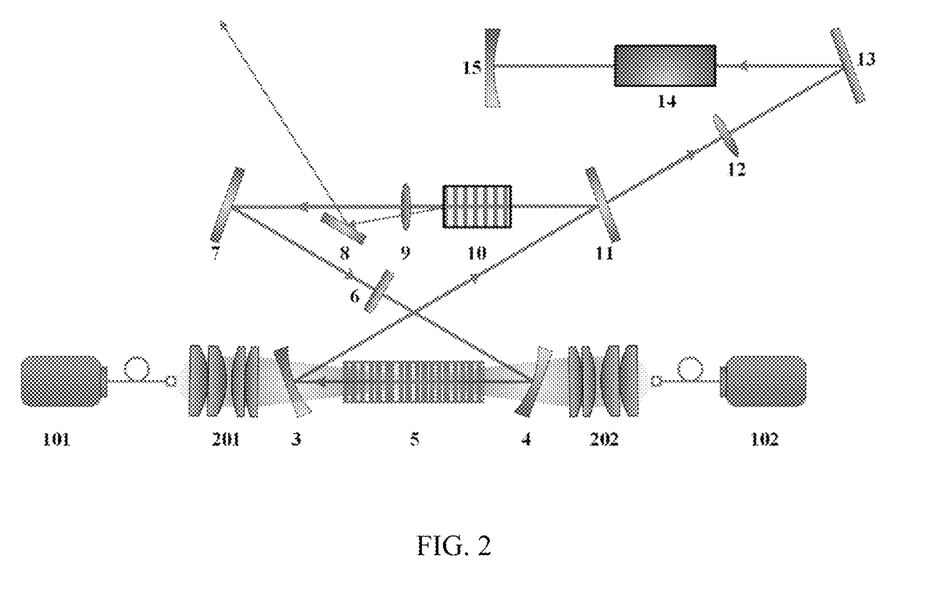
FIG. 2 is a schematic structural diagram of a multi-wavelength mid-infrared laser pulse train cavity dumped laser based on Nd:MgO:APLN crystal according to an embodiment of the present disclosure.

FIG. 2 is a schematic structural diagram of a multi-wavelength mid-infrared laser pulse train cavity dumped laser based on Nd:MgO:APLN crystal according to an embodiment of the present disclosure. As shown in FIG. 2, the multi-wavelength mid-infrared laser pulse train cavity dumped laser based on Nd:MgO:APLN crystal includes: a first pump module 101, a first coupling lens group 201, a second pump module 102, a second coupling lens group 202, a first cavity mirror 3, a second cavity mirror 4, Nd:MgO:APLN crystal 5, a plane lens 6, a third cavity mirror 7, an output mirror 8, a first lens 9, MgO:PPLN crystal 10, a fourth cavity mirror 11, a second lens 12, a fifth cavity mirror 13, a Q switch 14, a sixth cavity mirror 15.

The first cavity mirror 3, the second cavity mirror 4, the third cavity mirror 7 and the fourth cavity mirror 11 form a splayed parametric light oscillation cavity.

The Nd:MgO:APLN crystal 5 is placed between the first cavity mirror 3 and the second cavity mirror 4.

The plane lens 6 is placed between the second cavity mirror 4 and the third cavity mirror 7.

The first lens 9 and the MgO:PPLN crystal 10 are sequentially placed between the third cavity mirror 7 and the fourth cavity mirror 11.

The second lens 12 and the fifth cavity mirror 13 are sequentially arranged on an extension line formed by the first cavity mirror 3 and the fourth cavity mirror 11.

The Q switch 14 and the sixth cavity mirror 15 are sequentially arranged on the same side of the fifth cavity mirror 13.

The first cavity mirror 3, the second cavity mirror 4, the fourth cavity mirror 11, the fifth cavity mirror 13, the sixth cavity mirror 15 and the plane lens 6 form a fundamental frequency light resonant cavity.

The first coupling lens group 201 and the first pump module 101 are sequentially arranged outside the first cavity mirror 3, and the second coupling lens group 202 and the second pump module 102 are sequentially arranged outside the second cavity mirror 4.

The output mirror 8 is arranged aside below the first lens 9 to emit the generated multi-wavelength mid-infrared laser out of the resonant cavity.

In an embodiment of the present disclosure, the MgO:PPLN crystal 10 is one-dimensional polarized crystal. Alloy is evaporated on the upper and lower end surfaces of the MgO:PPLN crystal 10 and the MgO:PPLN crystal 10 is connected to a DC voltage source.

In an embodiment of the present disclosure, the Q switch 14 may be an acousto-optical Q switch, an electro-optical Q switch, or other switches.

In an embodiment of the present disclosure, the third cavity mirror 7, the fourth cavity mirror 11, and the fifth cavity mirror 13 are plane mirrors, and the first cavity mirror 3, the second cavity mirror 4, and the sixth cavity mirror 15 are plano-concave mirrors.

In an embodiment of the present disclosure, the output mirror 8 is coated with a 2.7 µm-4.5 µm total reflection film, and the first cavity mirror 3, the second cavity mirror 4, the third cavity mirror 7, and the fourth cavity mirror 11 are coated with a 2.7 µm-4.5 µm total reflection film. 4.5 µm total reflection film, and the plane lens 6 is coated with a 1084 nm total reflection film and a 2.7 µm-4.5 µm total transmission film.

Next, as an example, the 813 nm pump light is adopted to pump the Nd:MgO:APLN crystal 5 to obtain 1084 nm fundamental frequency light, and then parametric oscillation occurs to obtain 2.7 µm, 3.4 µm, 4.0 µm, 4.2 µm multi-wavelength mid-infrared light. The working principle of the multi-wavelength mid-infrared laser pulse train cavity dumped laser based on ND:MGO:APLN crystal is explained:

As shown in FIG. 2, the 813 nm pump light emitted by the first pump module 101 and the second pump module 102 passes through the first coupling lens group 201 and the first cavity mirror 3, and the second coupling lens group 202 and the second cavity mirror 4, respectively, then focuses from the two end surfaces of the Nd:MgO:APLN crystal 5 to the center of the crystal. The Nd:MgO:APLN crystal 5 absorbs the 813 nm pump light to form population inversion, then stimulated emission occurs, and 1084 nm fundamental frequency light is generated. The 1084 nm fundamental frequency light generated by the Nd:MgO:APLN crystal 5 oscillates in the fundamental frequency light resonant cavity composed of the first cavity mirror 3, the second cavity mirror 4, the fourth cavity mirror 11, the fifth cavity mirror 13, the sixth cavity mirror 15 and the plane lens 6. After the 1084 nm fundamental frequency light is reflected by the first cavity mirror 3, it passes through the fourth cavity mirror 11, is reflected by the fifth cavity mirror 13, and is directed to the sixth cavity mirror 15. After that, the 1084 nm fundamental frequency light propagates back through the fifth cavity mirror 13, the fourth cavity mirror 11, and the first cavity mirror 3, and then is reflected by the second cavity mirror 4 and directed to the plane lens 6. In this way, the 1084 nm fundamental frequency light undergoes a complete oscillation in the fundamental frequency light resonant cavity. The Q switch 14 is provided in the fundamental frequency light resonant cavity. If the Q switch 14 is turned off, fundamental frequency light oscillation cannot be formed in the fundamental frequency light resonant cavity, and the number of upper energy level particles in the Nd:MgO:APLN crystal 5 continues to accumulate; if the Q switch 14 is turned on, the number of the upper energy level particles in the Nd:MgO:APLN crystal 5 rapidly jump to achieve 1084 nm fundamental frequency light oscillation in the fundamental frequency light resonant cavity. In this way, by controlling the working state of the Q switch 14, the 1084 nm fundamental frequency light can be achieved in the fundamental frequency light resonant cavity.

The first cavity mirror 3, the second cavity mirror 4, the third cavity mirror 7, and the fourth cavity mirror 11 form a splayed parametric light oscillation cavity. During the fundamental frequency light oscillation process, the 1084 nm fundamental frequency light passes through the Nd:MgO:APLN crystal 5. Since four reciprocal lattice vectors are set in the Nd:MgO:APLN crystal 5, it can simultaneously compensate for four groups of phase mismatches, 2.7 µm, 3.4 µm, 4.0 µm, and 4.2 µm, to generate four-wavelength mid-infrared laser of 2.7 µm, 3.4 µm, 4.0 µm, and 4.2 µm. The four-wavelength mid-infrared laser is reflected by the first cavity mirror 3 and the fourth cavity mirror 11 and is injected into MgO:PPLN crystal 10. At this time, the MgO:PPLN crystal 10 is not loaded with voltage. The four-wavelength mid-infrared laser passes through the MgO:PPLN crystal 10, and then passes through the first lens 9, the third cavity mirror 7, the plane lens 6, and the second cavity mirror 4, and then is injected into the Nd:MgO:APLN crystal 5 again. In the Nd:MgO:APLN crystal 5, the four-wavelength mid-infrared laser of 2.7 µm, 3.4 µm, 4.0 µm, and 4.2 µm obtains gain again.

Figure 3:
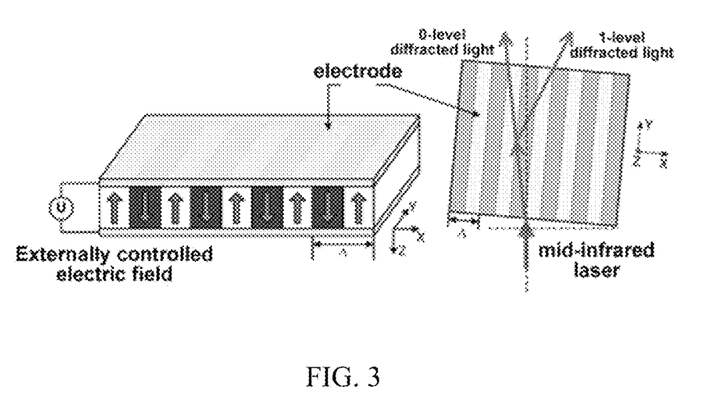
FIG. 3 is a schematic diagram showing the transverse electric field driving of MgO:PPLN crystal according to an embodiment of the present disclosure.
Figure 4:
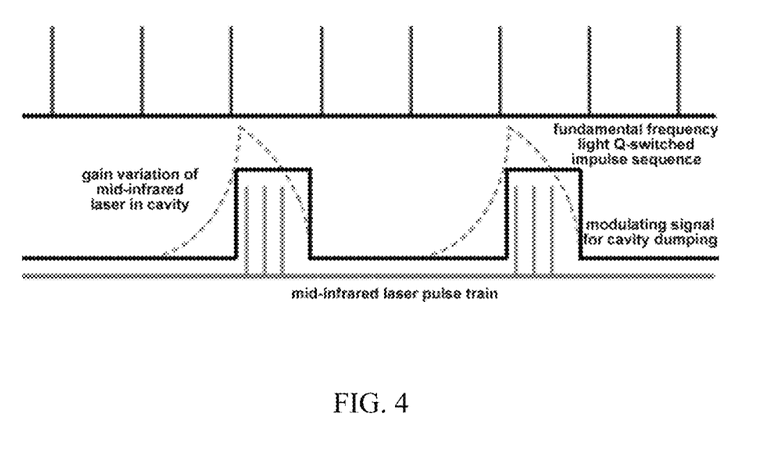
FIG. 4 is a schematic diagram of Q-switching and cavity dumped pulse timing according to an embodiment of the present disclosure.
Figure 5:
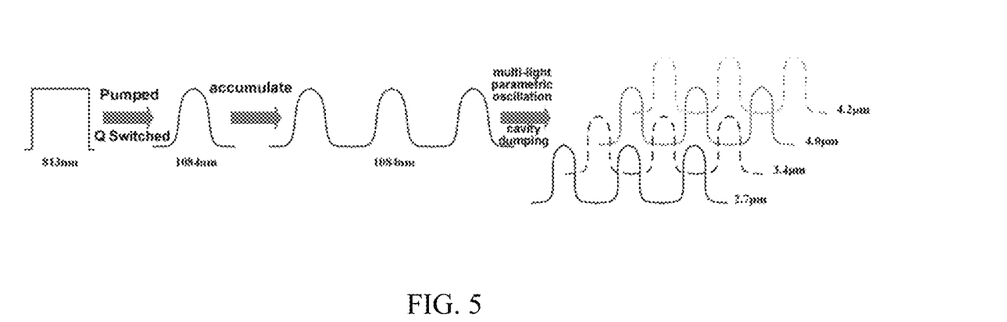
FIG. 5 is a schematic time domain diagram of cavity dumping according to an embodiment of the present disclosure.

As shown in FIG. 4, after the Q switch 14 is turned on three times, the energy of the 1084 nm fundamental frequency light in the fundamental frequency light oscillation cavity increases, and the converted four-wavelength mid-infrared laser continues to accumulate in the parametric light oscillation cavity. When the number of mid-infrared laser sub-pulses reaches the preset number requirement, the MgO:PPLN crystal 10 is loaded with a transverse electric field, and the mid-infrared laser undergoes diffraction modulation. As shown in FIG. 3, the laser propagation path is deflected, and all mid-infrared laser pulses in the parametric light oscillation cavity are dumped out, that is, the cavity dumped phenomenon is realized, as shown in FIG. 5. The deflected mid-infrared laser pulse passes through the first lens 9, is reflected by the output mirror 8, and exits out of the parametric light oscillation cavity, ultimately forming a multi-wavelength mid-infrared laser pulse train output with narrow pulse width and high peak power.

The above description only refers to optional embodiments of the present disclosure and an illustration of the applied technical principle. Those skilled in the art should understand that the scope of invention involved in the present disclosure is not limited to the technical solutions formed by the specific combination of the above-mentioned technical features, but should cover other technical solutions formed by any combination of the above-mentioned technical features or equivalent features thereof without departing from the inventive concept, for example, the technical solutions formed by replacing the above-mentioned features with technical features with similar functions disclosed in the present disclosure (but not limited to).

What is claimed is:

1. A multi-wavelength mid-infrared laser pulse train cavity dumped laser based on ND:MGO:APLN crystal, comprising a first pump module, a first coupling lens group, a second pump module, a second coupling lens group, a first cavity mirror, a second cavity mirror, Nd:MgO:APLN crystal, a plane lens, a third cavity mirror, a output mirror, a first lens, MgO:PPLN crystal, a fourth cavity mirror, a second lens, a fifth cavity mirror, a Q switch, a sixth cavity mirror, wherein:

the first cavity mirror, the second cavity mirror, the third cavity mirror and the fourth cavity mirror form a splayed parametric light oscillation cavity;

the Nd:MgO:APLN crystal is placed between the first cavity mirror and the second cavity mirror;

the plane lens is placed between the second cavity mirror and the third cavity mirror;

the first lens and the MgO:PPLN crystal are sequentially placed between the third cavity mirror and the fourth cavity mirror;

the second lens and the fifth cavity mirror are sequentially arranged on an extension line formed by the first cavity mirror and the fourth cavity mirror;

the Q switch and the sixth cavity mirror are sequentially arranged on the same side of the fifth cavity mirror;

the first cavity mirror, the second cavity mirror, the fourth cavity mirror, the fifth cavity mirror, the sixth cavity mirror and the plane lens form a fundamental frequency light resonant cavity;

the first coupling lens group and the first pump module are sequentially arranged outside the first cavity mirror, and the second coupling lens group and the second pump module are sequentially arranged outside the second cavity mirror;

the output mirror is arranged aside below the first lens to emit the generated multi-wavelength mid-infrared laser out of the resonant cavity.

2. The laser according to claim 1, wherein the MgO:PPLN crystal is one-dimensional polarized crystal, with alloy evaporated on upper and lower end surfaces of the crystal and connected to a DC voltage source.

3. The laser according to claim 2, wherein the Q switch is an acousto-optical Q switch or an electro-optical Q switch.

4. The laser according to claim 2, wherein the third cavity mirror, the fourth cavity mirror and the fifth cavity mirror are plane mirrors.

5. The laser according to claim 2, wherein the first cavity mirror, the second cavity mirror and the sixth cavity mirror are plano-concave mirrors.

6. The laser according to claim 2, wherein the output mirror is coated with a total reflection film of 2.7 μm-4.5 μm.

7. The laser according to claim 2, wherein the first cavity mirror, the second cavity mirror, the third cavity mirror and the fourth cavity mirror are coated with a total reflection film of 2.7 μm-4.5 μm.

8. The laser according to claim 1, wherein the Q switch is an acousto-optical Q switch or an electro-optical Q switch.

9. The laser according to claim 8, wherein the third cavity mirror, the fourth cavity mirror and the fifth cavity mirror are plane mirrors.

10. The laser according to claim 8, wherein the first cavity mirror, the second cavity mirror and the sixth cavity mirror are plano-concave mirrors.

11. The laser according to claim 3, wherein the output mirror is coated with a total reflection film of 2.7 μm-4.5 μm.

12. The laser according to claim 8, wherein the first cavity mirror, the second cavity mirror, the third cavity mirror and the fourth cavity mirror are coated with a total reflection film of 2.7 μm-4.5 μm.

13. The laser according to claim 1, wherein the third cavity mirror, the fourth cavity mirror and the fifth cavity mirror are plane mirrors.

14. The laser according to claim 13, wherein the first cavity mirror, the second cavity mirror and the sixth cavity mirror are plano-concave mirrors.

15. The laser according to claim 13, wherein the output mirror is coated with a total reflection film of 2.7 μm-4.5 μm.

16. The laser according to claim 1, wherein the first cavity mirror, the second cavity mirror and the sixth cavity mirror are plano-concave mirrors.

17. The laser according to claim 16, wherein the output mirror is coated with a total reflection film of 2.7 μm-4.5 μm.

18. The laser according to claim 1, wherein the output mirror is coated with a total reflection film of 2.7 μm-4.5 μm.

19. The laser according to claim 1, wherein the first cavity mirror, the second cavity mirror, the third cavity mirror and the fourth cavity mirror are coated with a total reflection film of 2.7 μm-4.5 μm.

20. The laser according to claim 1, wherein the plane lens is coated with a total reflection film of 1084 nm and a total transmission film of 2.7 μm-4.5 μm.

* * * * *